No. 724,737. PATENTED APR. 7, 1903.
H. M. REYNOLDS.
DRILL CHUCK.
APPLICATION FILED JULY 5, 1902.
NO MODEL.

WITNESSES:
J. J. Laass
G. Van Vorst

INVENTOR
Herman M. Reynolds
By E. Laass
ATTORNEY.

UNITED STATES PATENT OFFICE.

HERMAN M. REYNOLDS, OF ONEIDA, NEW YORK.

DRILL-CHUCK.

SPECIFICATION forming part of Letters Patent No. 724,737, dated April 7, 1903.

Application filed July 5, 1902. Serial No. 114,341. (No model.)

*To all whom it may concern:*

Be it known that I, HERMAN M. REYNOLDS, a citizen of the United States, and a resident of Oneida, in the county of Madison, in the State of New York, have invented new and useful Improvements in Drill-Chucks, of which the following, taken in connection with the accompanying drawings, is a full, clear, and exact description.

This invention is an improvement of the chuck shown in my Letters Patent No. 620,612, dated March 7, 1899.

The object of my present invention is to provide the chuck with simple, inexpensive, and effective means for automatically reinforcing the grip of the drill-holding jaws proportionately to the degree of torsional strain exerted on the drill during its operation; and to that end the invention consists in the novel means for automatically actuating the screw which operates the jaws of the chuck, as hereinafter more fully described and claimed.

Figure 1:
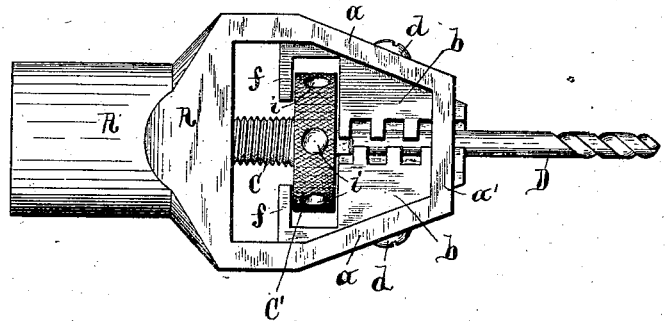
Figure 2:
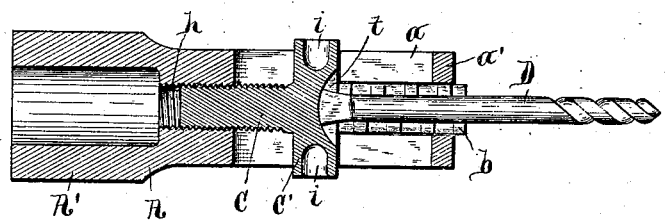
Figure 3:
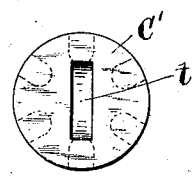

In the accompanying drawings, Figure 1 is a side view of a chuck embodying my invention. Fig. 2 is a longitudinal section of said chuck, and Fig. 3 is a face view of the head of the screw which operates the jaws.

Similar letters of reference indicate corresponding parts.

A represents the flat skeleton body of the chuck, which body is formed of two oppositely-disposed guides $a\ a$, extending from the attaching-shank A' of the body convergently toward the axis of the chuck and united at their free ends by a transverse bar $a'$, the center of which is provided with an opening for the protrusion of the outer ends of the jaws $b\ b$. The said jaws are formed with longitudinally-sloping backs by which they are adjustably seated on the guides $a\ a$ of the chuck-body and are sustained thereon by lugs or screws $d\ d$, passing through longitudinal slots in the said guides and secured to the jaws, as shown in my Letters Patent. The inner faces of the jaws are formed with the usual teeth for gripping the drill or analogous tool between them. The inner ends of the jaws are formed with lips $f\ f$, which engage the back of the screw-head C', while the face of said head bears on the inner end faces of the jaws. The screw C, which is integral with the head C', works in a correspondingly-threaded orifice $h$ in the rear portion of the body A. By turning said screw the jaws $b\ b$ are caused to move longitudinally either inward or outward, according to the direction in which the screw is turned. The inward movement of the jaws separates them to allow the drill or analogous tool to be inserted between them. The outward movement of the jaws causes them to move toward the axis of the chuck and to grip the tool between them.

The peripheral face of the screw-head C' is serrated to allow the screw to be easily turned by hand. Said face is also provided with wrench-holes $i\ i$ for the insertion of the end of a stout pin by which to turn the screw for tightening the grip of the jaws on the tool.

All of the aforesaid construction corresponds to the chuck shown and described in my Letters Patent hereinbefore mentioned. My present improvement of said chuck consists of suitable means for transmitting motion from the gripped tool to the jaw-operating screw to turn the same in opposite direction from the rotation of the chuck and force said screw to automatically tighten the grip of the jaws during the operation of the chuck.

I do not wish to be limited to any specific construction of said bearings, their essential feature and function being the coöperation with the drill, so as to obtain therefrom a screw-driver which is actuated by the torsional strain exerted on the operating-drill D and causes the screw C to automatically tighten the grip of the jaws on the drill proportionate to the degree of torsional strain exerted on the drill during its operation. For simplicity of construction I prefer to form said bearings by a transverse groove $t$ in the face of the screw-head C' and preferably shaped and disposed to receive and grip the corresponding tongue-shaped end of the drill D, as shown in Fig. 2 of the drawings.

What I claim as my invention is—

1. The combination with the chuck-body, tool-gripping jaws and the screw operating said jaws, of means for transmitting motion from the gripped tool to the aforesaid screw to automatically tighten the grip of the jaws during the operation of the chuck.

2. The combination with the chuck-body formed with convergent guides, jaws seated on said guides, and the screw operating said jaws, of a screw-driver formed on the attaching end of the tool gripped by the jaws and engaging the aforesaid screw to turn the same in opposite direction from the rotation of the chuck and force said screw to tighten the grip of the jaws automatically during the operation of the chuck.

3. The combination with the chuck-body formed with guides extending lengthwise of said body and convergently toward the axis of the chuck, jaws seated on said guides, and the jaw-actuating screw disposed longitudinally in the axis of the chuck-body, of a head fixed to said screw and transmitting motion to the jaws and provided with a transverse groove receiving the corresponding tongue-shaped end of the drill as set forth.

HERMAN M. REYNOLDS. [L. S.]

Witnesses:
M. H. COLWAY,
CHARLES SHUMWAY.